United States Patent [19]

Krause et al.

[11] Patent Number: 4,748,625
[45] Date of Patent: May 31, 1988

[54] OPTIMUM BAUD RATE TRANSMISSION SYSTEM

[75] Inventors: James J. Krause, Hanover Park; William C. Hepker, Vernon Hills; Michael L. Singer, Hanover Park, all of Ill.

[73] Assignee: Motorola, Inc., Schaumburg, Ill.

[21] Appl. No.: 890,052

[22] Filed: Jul. 28, 1986

[51] Int. Cl.⁴ .............................................. G06F 11/00
[52] U.S. Cl. .......................................... 371/22; 371/5; 375/34
[58] Field of Search .................. 371/5, 22; 375/13, 34

[56] References Cited

U.S. PATENT DOCUMENTS

| | | | |
|---|---|---|---|
| 3,449,716 | 6/1969 | Brothman et al. | 371/5 X |
| 3,534,264 | 10/1970 | Blasbalg et al. | 371/5 X |
| 4,001,559 | 1/1977 | Osborne et al. | 235/151.31 |
| 4,110,558 | 8/1978 | Kageyama et al. | 371/5 X |
| 4,225,964 | 9/1980 | Cagle et al. | 375/86 |
| 4,270,205 | 5/1981 | DeShon | 371/32 |
| 4,309,771 | 1/1982 | Wilkens | 375/58 |
| 4,332,029 | 5/1982 | Campbell et al. | 371/22 |
| 4,351,059 | 9/1982 | Gregoire et al. | 375/10 |
| 4,393,498 | 7/1983 | Jackson et al. | 371/20 |
| 4,404,677 | 9/1983 | Grande et al. | 371/69 |
| 4,589,111 | 5/1986 | Adachi | 371/32 |
| 4,606,044 | 8/1986 | Kudo | 375/13 |
| 4,630,126 | 12/1986 | Kaku et al. | 375/34 |

Primary Examiner—Charles E. Atkinson
Attorney, Agent, or Firm—Robert J. Crawford; John H. Moore

[57] ABSTRACT

Disclosed is a process which may be used in a communication arrangement between two stations. In at least one of the stations, an MPU is utilized to control an internal operating system and a baud rate generator. The MPU performs periodic self tests to determine how busy it is, and if it is not too busy with internal tasks it calls a baud rate routine to adjust the rate at which the stations are communicating. This periodic testing allows the baud rate to be adjusted according to current environmental conditions. Further, a timer is provided, internal to the MPU, which is used to prevent the baud rate routine from being executed too frequently.

4 Claims, 3 Drawing Sheets

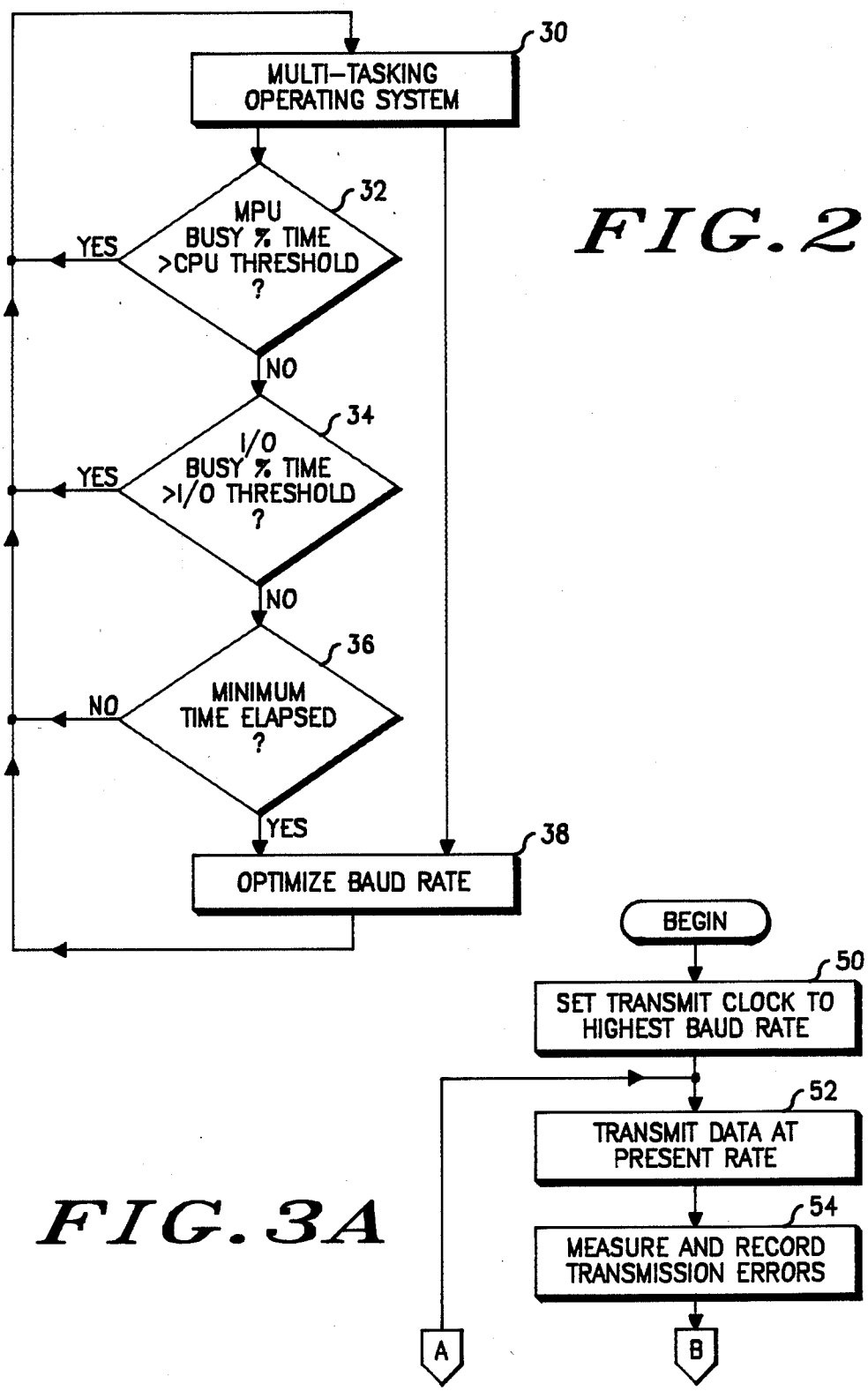

OPTIMUM BAUD RATE TRANSMISSION SYSTEM

FILED OF THE INVENTION

The present invention relates generally to digital communication, and, more particularly, to control of baud rate transmission between terminal units.

DESCRIPTION OF THE PRIOR ART

Accurate high speed communication has long been recognized as a desirable characteristic of any communication system. Since the baud rate determines the transmission speed of the data in a digital communication system, there have been ongoing efforts to increase the baud rate for given applications. Many of these efforts have been directed to overcoming interference which causes the transmitted data to become degraded at higher speeds. However, notwithstanding these efforts, every environment has a limit at which the accuracy of the transmitted data becomes severely degraded if the baud rate is further increased.

Such degradation may be caused by a number of noise related factors. For example, where the communication is over telephone lines, the degradation may be due to cross-talk interference; where the communication is via radio waves, the degradation may be due to spurious interference from adjacent radio wave transmissions; etc. Each environment introduces its own interference which degrades the accuracy of the transmitted data and limits the speed at which the data may be transmitted.

Conventional communication systems have been designed such that the baud rate is maximized and fixed at a baud rate for which the worst accuracy of transmitted data is tolerable. In this sense, the communication speed may be considered "optimized", i.e., the baud rate cannot be increased without receiving unacceptable transmissions.

Although this type of design is useful for most applications, in some applications the environment creates unexpected changes such that the level of noise interference substantially changes in level. Such an environmental change often lasts for an extended period of time and results in a substantial portion of the communication being destroyed. For example, if the cross talk in a telephone transmission increases to abnormal levels, the accuracy of the data will often degrade to an unacceptable transmission quality.

There has, however, been a widely accepted practice of compensation for such unexpected occurences. The compensation is accomplished by fixing the baud rate at a decreased level to allow tolerance for this type of potential interference. Nevertheless, since the baud rate is reduced by this compensation, the potential efficiency is reduced as well.

Accordingly, a method of communication is needed which "optimizes" communication efficiency while maintaining tolerable levels of accuracy in transmitted data.

OBJECTS AND SUMMARY OF THE PRESENT INVENTION

It is an object of the present invention to provide a method for communicating between terminal units which overcomes the above described shortcomings.

It is a further object of the present invention to provide a method of digital communication which maximizes the communication speed according to the interference of the surrounding environment.

The invention may briefly be described in terms of a prefered embodiment involving a communication arrangement between two stations. In at least one of the stations, an MPU is utilized to control an internal operating system and a baud rate generator. The MPU performs periodic self tests to determine how busy it is, and if it is not too busy with internal tasks, it calls a baud rate (transmission rate) routine to adjust the rate at which the stations are communicating. This periodic testing allows the baud rate to be adjusted according to current environmental conditions. Further, a timer is provided, internal to the MPU, which is used to prevent the baud rate routine from being executed too frequently.

The baud rate routine, as described in FIGS. 3a and 3b, sets the communication at the highest baud rate and progressively decrements the baud rate, as it measures the efficiency of data transmitted at each rate, until the most efficient baud rate is determined. The routine then sets the baud rate at this most efficient one for future communication.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in which like reference numerals identify like elements, and wherein:

FIG. 2 is a flowchart depicting an implementation of the present invention in an operating system environment; and FIG. 3A and 3B comprise an expanded flowchart of block 38 in FIG. 2.

DETAILED DESCRIPTION OF THE PREFERRED EMBODIMENT

Figure 1:
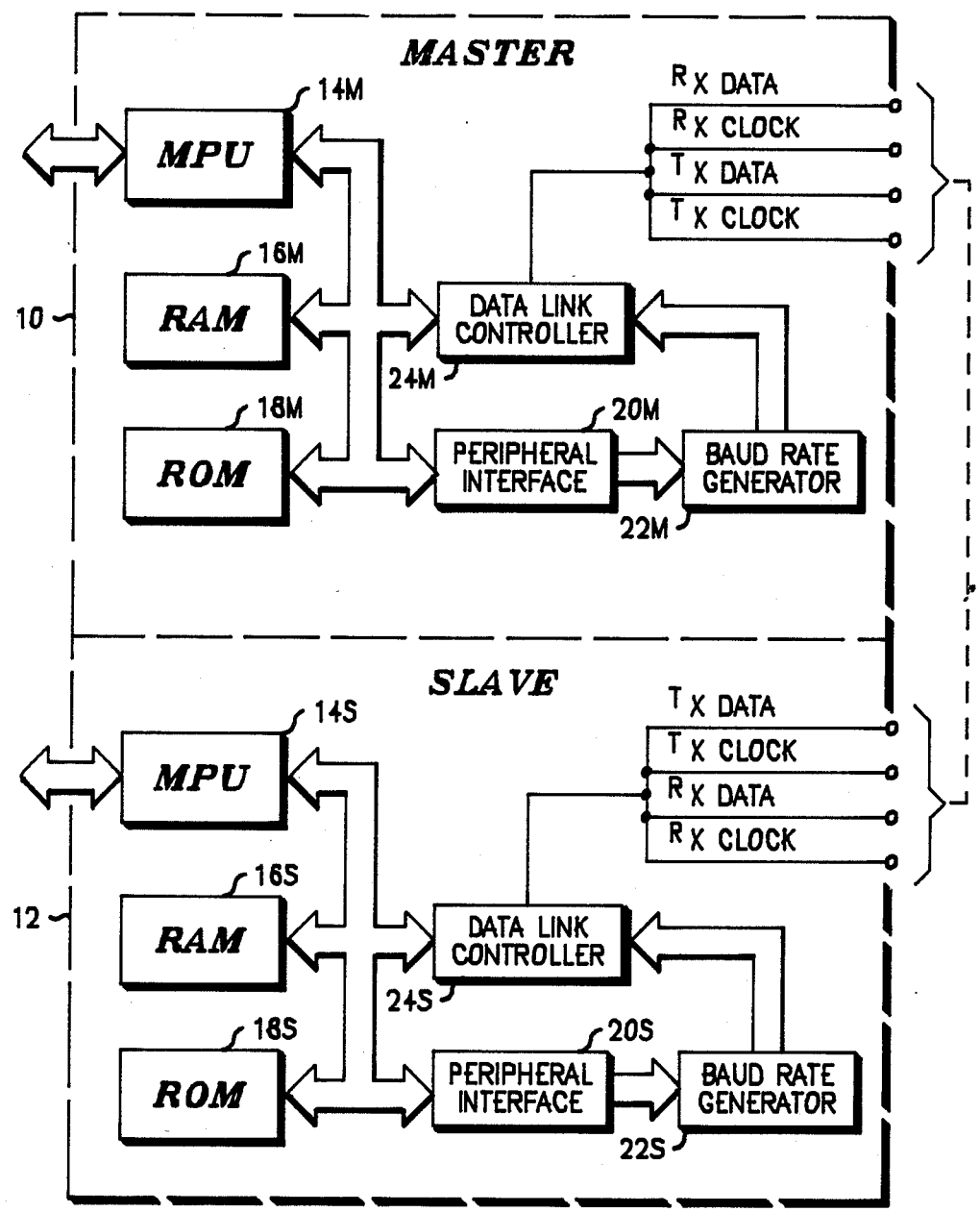
FIG. 1 is a schematic representation, in the form of a block diagram and in accordance with the present invention, of a communication system which includes two stations which communicate at a particular baud rate.

Referring to FIG. 1, the illustrated block diagram shows an arrangement in which the present invention may be used. Stations 10 and 12 are connected to communicate with each other in a conventional manner. In the preferred embodiment, station 10 is the master, and station 12 is the slave. In such an arrangement, it is understood that communication protocol is controlled by the master 10, while the slave 12 responds to the master's commands in a subordinate capacity.

FIG. 1 shows each station including a microprocessor unit (MPU) 14m and 14s which is used to control the functions of the respective station. Each MPU is connected to read-write memory (RAM) 16m and 16s, read only memory (ROM) 18m and 18s, a peripheral interface 20m and 20s, and a data link controller (DLC) 24m and 24s. The RAMs and ROMs are used in the conventional manner. The peripheral interfaces 20m and 20s are used to set the baud rate for their respective baud rate generators 22m and 22s. Each baud rate generator is connected to its respective DLC for the purpose of establishing a continuous transmit (Tx) clock for the DLC's transmit clock output.

As mentioned above, the master 10 is connected to the slave 12 in the conventional manner. In particular, the master's receive (Rx) data input is connected to the slave's Tx data output. Conversely, the master's Tx data output is connected to the slave's Rx data input. Hence, each station receives the other's Tx data at a clock rate which is predetermined and established over the communication link.

The slave 12 sets baud rate generator 22s to the Rx clock rate it receives from master 10 such that the master dictates the clock rate for both the slave and the master stations. This may be accomplished in a number of ways, one of which is described in the following example.

In this example, it is presumed that the master 10 and slave 12 are designated as such in their respective programs (as stored in ROM). Immediately after power-up, both the master 10 and the slave 12 set their respective Tx clocks to the lowest of a predetermined set of baud rates, e.g. 300 bps. The slave then begins monitoring DLC 24s for initial input commands. The master will send the slave a command requesting that a particular baud rate be used for communication therebetween. When the slave receives this command, it sets DLC 24s to transmit at the same baud rate and begins monitoring DLC 24s for data transmitted by DLC 24m. After a slight delay, the master will begin transmitting at this dictated data rate, and communication between the stations is established at the new data rate.

The above example will be helpful background for subsequent discussion regarding control of the baud rate in each station.

Referring now to FIG. 2, the illustrated flowchart shows an implementation of the present invention in an operating system environment. The operating system depicted in block 30 is of the type which performs multitasking and which prioritizes and time schedules its various tasks. The operating system may be used for one or both of the stations in FIG. 1, but will be explained with respect to its implementation in the master station 10. Such an operating system is available from Motorola for use in a Motorola 68000 MPU and commercially known as "System V/68".

The flowchart in FIG. 2 is structured to periodically check the percentage of time the MPU is busy. Conversely, this is often referred to as the MPU idle time. This may be accomplished in block 32 by examining one or more internal queues which accumulate, in a prioritized manner, tasks needing attention. Alternatively, this may be accomplished by determining the time percentage that the MPU is spending to perform tasks and comparing that time percentage to a predetermined threshold. The latter method is preferred and shown in block 32.

If the percentage of time that the MPU is spending to perform tasks is greater than the predetermined threshold, then flow proceeds to block 30 where additional time is dedicated to performing these tasks. Otherwise, flow proceeds to block 34 where a similar test is performed for input/ouput (I/O) tasks.

The I/O test in block 34 is preferably accomplished by examining one or more internal queues which specifically accumulate I/O tasks needing attention. The number of such I/O tasks is compared to a predetermined threshold to determine whether or not the MPU should dedicate additional time to these tasks. If the threshold is exceeded, flow proceeds to block 30 to perform these tasks. Otherwise, flow proceeds to block 36 to determine if a timer has timed out.

The timer referred to in block 36 is used to establish a minimum time between executions of the routine which optimizes the baud rate for the system. This routine is depicted in block 38, and will be discussed in detail in FIGS. 3a and 3b. If the minimum time, determined by a software timer, has elapsed, flow is permitted to proceed to block 38 for baud rate optimization before returning to block 30. If the minimum time has not elapsed, flow proceeds back to block 30. Hence, flow proceeding from block 36 to block 38 indicates that the MPU is not too busy, that I/O processing requirements are too not overwhelming and that there has been a minimum time which has lapsed since the baud rate was last optimized.

Flow may also proceed to block 38 from block 30. It may be desirable for the operating system 30 to call the optimization routine 30 to handle situations such as when the I/O processing tasks indicate that there are an excessive number of I/O errors. In this instance, the excessive I/O errors would indicate potential problems with the serial communication link; possibly requiring a baud rate reduction. In summary, the flowchart in FIG. 2 optimizes the baud rate in the serial communication link out of necessity (excessive errors), and in time spaced intervals provided that the MPU is not burdened by exceesive tasks.

Figure 3B:
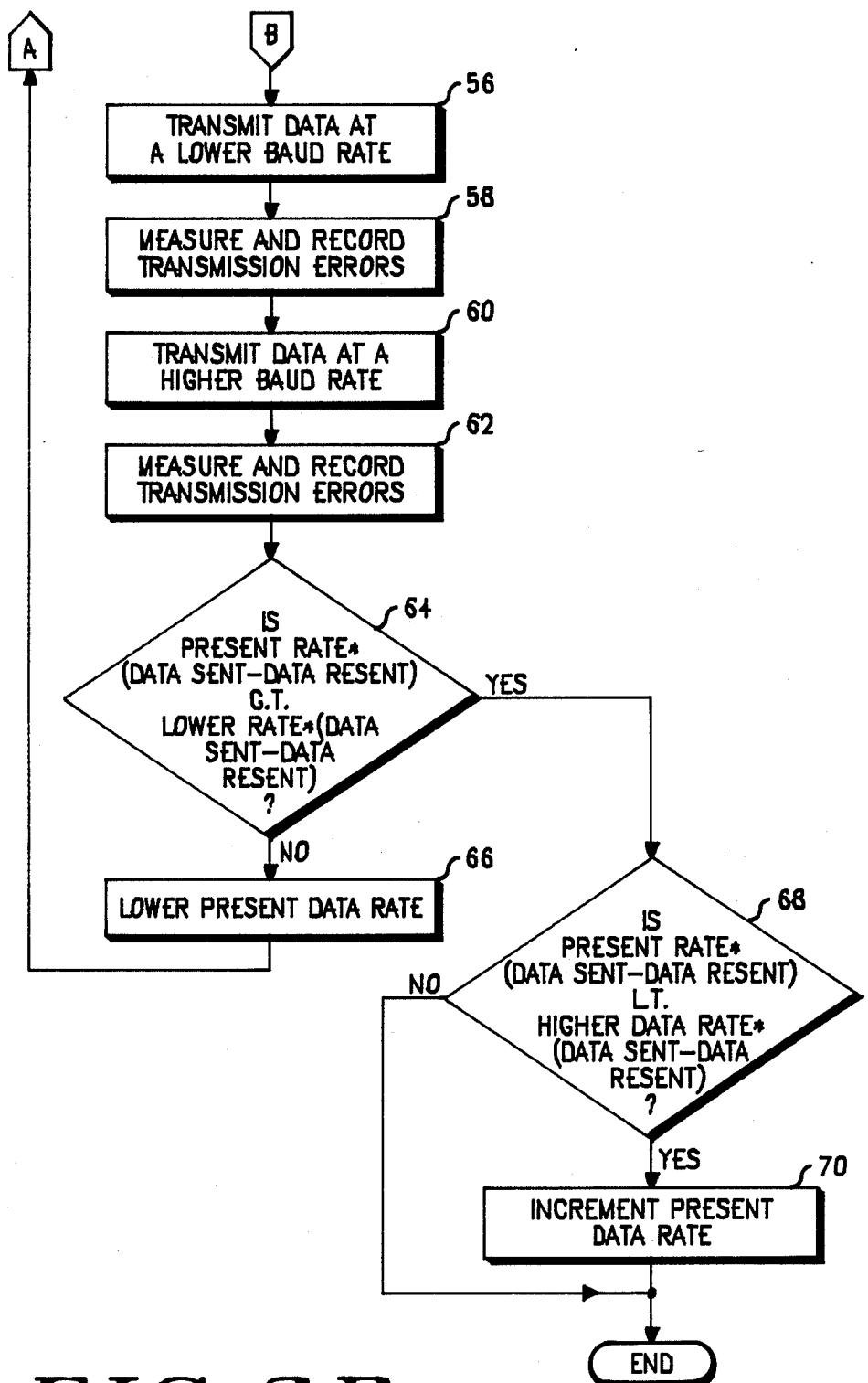

In FIGS. 3a and 3b, the baud rate optimization routine depicted in block 38 is expanded. In block 50 in FIG. 3a, the optimization process begins by setting the transmit clock to the highest baud rate. As mentioned above, this optimization is discussed with respect to the master station 10 in FIG. 1. Further, it should be understood that conventional baud rate generators are selectable to a limited number of predetermined baud rates. Hence, reference herein of various levels of baud rates pertains to a limited number of baud rates available from most conventional baud rate generators.

In block 52, data is transmitted at the present data rate. The first time through block 52, the present data rate would be the highest baud rate, as selected in block 50.

In block 54 the transmitted data is used to measure and record errors which occurred during communication between the stations. This may be accomplished in any of a number of conventional ways. In the preferred embodiment, the data is sent in segmented blocks and, for each block, the receiving station (the slave) either accepts the data with a "ACK" response or it rejects the data with a "NACK" response. If the sending station, (the master) cannot interpret the receiving stations response, a NACK is presumed. In the present context, a NACK will be used to indicate that the segment of data should be resent. A simplified example of the functions of block 54 may be described as follows.

Given that the present baud rate is 9600 bits per second (bps), presume 10 segments of data are sent. In response to the 10 segments are 7 ACKs and 3 NACKs. At block 54, for a 9600 baud rate transmission a count of 7 ACKs would be recorded and a count 3 NACKs would be recorded.

In block 56 in FIG. 3b, the master station transmits data at a baud rate lower than the present baud rate. Again, transmission errors are measured and recorded for the lower baud rate, as depicted in block 58.

In block 60, the master station transmits data at a baud rate which is higher than the present baud rate. In block 62, transmission errors are measured and recorded for the higher baud rate as discusseed above.

At this point in the flow chart, the master station has transmitted segments of data at 3 baud rates, the higher baud rate, the present baud rate and the lower baud rate (in descending order of speed). Further, transmission errors have been measured and recorded for each of these 3 baud rates.

In block 64, the recorded transmission errors for the present rate and the lower rate are used to determine if the present data rate realizes an acceptable transmission error measurement. This is accomplished, as shown in block 64, by comparing the following two expressions:

(a) [Present Rate*(amt of data sent—amt of data resent)]

(b) [(Lower Rate*(amt of data sent—amt of data resent)]

If the former parameter is greater than the latter, then the present data rate is more efficient than the lower data rate and flow continues to block 68 to determine if a higher data rate which is more efficient could be found.

If the former parameter is not greater than the latter, then the present data rate is not more efficient than the lower data rate and flow proceeds to block 66 to lower the present data rate since it was not the most efficient. Flow then proceeds to block 52, and the steps in blocks 52 through 64 are repeated for the lesser "present" rate.

In block 68, the recorded transmission errors for the present rate and the higher rate are used to determine if the higher data rate realizes an acceptable transmission error measurement. This is accomplished, as shown in block 64, by comparing the following two expressions:

(a) [Present Rate*(amt of data sent—amt of data resent)]

(b) [(Higher Rate*(amt of data sent—amt of data resent))]

If the former parameter is not less than the latter, then the present data rate is more efficient than the higher data rate and the optimization routine ends since the present data rate is the most efficient.

If the former parameter is less than the latter, then the present data rate is not more efficient than the higher data rate and flow proceeds to block 70 where the present data rate is incremented to the higher data rate and the optimization routine ends with future communication at this data rate.

As described above, the present invention provides a technique to periodically and automatically find the highest baud rate which produces the most efficient communication with respect to errors transmitted; the rates are searched in a sequential order to realize minimum time delay in locating the most efficient rate for the current environmental conditions. Further, to minimize MPU interruption time, the present invention provides means for determining particular times, in a general operating system environment, when the baud rate should be optimized, thereby realizing optimal overall operation of the MPU and optimal efficiency in the communication between the stations.

While the invention has been particularly shown and described with reference to a preferred embodiment, it will be understood by those skilled in the art that various other modifications and changes may be made to the present invention described above without departing from the spirit and scope thereof.

What is claimed is:

1. In a communication arrangement having a first and a second station which communicate with one another at one of a plurality of transmission rates, and wherein the first station has an MPU running a central program, a method for maintaining communication efficiency between the stations, comprising the steps of:

(a) providing a transmission rate routine which is capable of modifying the communication transmission rate between the stations and which may be called and executed under control by the central program;

(b) determining an idle time parameter of the MPU;

(c) providing a threshold against which the idle time parameter may be compared;

(d) comparing the idle time parameter of the MPU to the threshold; and (e) executing the transmission rate routine when the idle time parameter is greater than the threshold, thereby periodically and automatically adjusting the transmission rate to maintain efficient communication between the stations.

2. The method for maintaining communication efficiency between the stations, according to claim 1, further including determining an error rate in the communication between the stations and executing the transmission rate routine if the error rate is excessive.

3. The method for maintaining communication efficiency between the stations, according to claim 1, wherein the transmission rate routine transmits data at different transmission rates in a sequential order until the most efficient rate for communication between the stations is found.

4. The method for maintaining communication efficiency between the stations, according to claim 1, further including the step of determining a minimum time interval during which the transmission rate routine should not be executed, and executing the transmission rate routine at times outside the interval.

* * * * *